(12) United States Patent
David et al.

(10) Patent No.: US 10,107,170 B2
(45) Date of Patent: Oct. 23, 2018

(54) METHOD FOR VALIDATING SIGNALS GENERATED BY ACOUSTIC SENSORS

(71) Applicant: GM GLOBAL TECHNOLOGY OPERATIONS LLC, Detroit, MI (US)

(72) Inventors: Giovanni David, Turin (IT); Marco Iacovone, Turin (IT)

(*) Notice: Subject to any disclaimer, the term of this patent is extended or adjusted under 35 U.S.C. 154(b) by 60 days.

(21) Appl. No.: 15/350,455

(22) Filed: Nov. 14, 2016

(65) Prior Publication Data
US 2018/0135494 A1    May 17, 2018

(51) Int. Cl.
| | | |
|---|---|---|
| *F01N 11/00* | (2006.01) | |
| *F01N 3/20* | (2006.01) | |
| *G01F 23/296* | (2006.01) | |
| *G01F 25/00* | (2006.01) | |

(52) U.S. Cl.
CPC .............. *F01N 11/00* (2013.01); *F01N 3/206* (2013.01); *F01N 3/2066* (2013.01); *G01F 23/296* (2013.01); *G01F 25/0061* (2013.01); *F01N 2610/02* (2013.01); *F01N 2610/1406* (2013.01); *F01N 2900/1814* (2013.01)

(58) Field of Classification Search
CPC ........ F01N 3/2066; F01N 3/208; F01N 11/00; F01N 2550/05; F01N 2610/02; F01N 2610/10; F01N 2610/105; F01N 2610/1406; F01N 2610/148; F01N 2900/1811; F01N 2900/1812; F01N 2900/1814
See application file for complete search history.

(56) References Cited

U.S. PATENT DOCUMENTS

| | | | | |
|---|---|---|---|---|
| 2012/0118059 A1* | 5/2012 | Reimer | ................. | F01N 3/2066 73/290 V |
| 2014/0334983 A1* | 11/2014 | Yang | ....................... | F01N 11/00 422/119 |
| 2016/0363473 A1* | 12/2016 | Jung | ..................... | F01N 3/2066 |
| 2017/0044949 A1* | 2/2017 | Khaled | ................... | F01N 3/208 |

* cited by examiner

*Primary Examiner* — Audrey K Bradley

(57) ABSTRACT

A method for monitoring the reductant quantity in a reservoir method is provided. The reductant is stored within the reservoir for use within an exhaust gas treatment system of a vehicle, and the reservoir comprises an acoustic sensor disposed within the reductant and capable of generating signals relating to the volume of reductant within the reservoir. The method includes generating a first signal for validation after a system wakeup, conducting a wakeup validation using a wakeup condition, wherein the wakeup condition includes determining if the first signal is within a first accuracy threshold relative to a validated signal generated during the previous operating cycle; and conducting a secondary validation for a signal generated after the first signal using one or more secondary validation conditions. The method can further comprise conducting one or more subsequent validations for one or more signals generated after the first signal.

19 Claims, 3 Drawing Sheets

METHOD FOR VALIDATING SIGNALS GENERATED BY ACOUSTIC SENSORS

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons and oxides of nitrogen ($NO_x$) as well as condensed phase materials (liquids and solids) that constitute particulate matter. Reduction of $NO_X$ emissions from an exhaust feed stream containing excess oxygen is a challenge for vehicle manufacturers.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into to ammonia, and absorbed by the SCR device. The ammonia then reduces the NO to nitrogen in the presence of the SCR catalyst. Reductant is typically stored in a reservoir, and must be replenished periodically. Accurate detection of reductant reserves remains a challenge.

SUMMARY

According to an aspect of an exemplary embodiment, a method for monitoring a reductant quantity in a reservoir is provided. The reservoir is incorporated in an exhaust gas treatment system of a vehicle, and the reservoir comprises an acoustic sensor disposed within the reductant capable of generating signals relating to the volume of reductant within the reservoir. Additionally or alternatively, the exhaust gas treatment system includes an exhaust gas stream supplied by an exhaust gas source to a selective catalytic reduction filter device. The exhaust gas source can include an ICE, such as a gasoline or diesel ICE. The method for monitoring a reductant quantity in a reservoir includes generating a first signal for validation after a system wakeup using the acoustic sensor, conducting a wakeup validation using a wakeup condition, wherein the wakeup condition includes determining if the first signal is within a first accuracy threshold relative to a validated signal generated during the previous operating cycle and conducting a secondary validation for a signal generated after the first signal using one or more secondary validation conditions.

A secondary validation condition can include comparing the second signal to a reductant level estimation, wherein the reductant level estimation is determined using reductant flow rate data collected between the generation of the second signal and the generation of a previously validated signal. A secondary validation condition can include determining if an ambient temperature is above a calibrated temperature. A secondary validation condition can include determining a weighted average of plurality temperature sensor measurements and determining if the weighted average is above a calibrated temperature, wherein the weighted average assigns a weight to each of the plurality of temperature sensor measurements. A secondary validation condition can include determining if the mass of unfrozen reductant is above a calibrated threshold, wherein the calibrated threshold is set in order to ensure that a minimum amount of unfrozen reductant is present in the reservoir. The method can optionally further include conducting subsequent validation of a signal generated after the second signal using the one or more secondary validation conditions.

Although many of the embodiments herein are describe in relation to monitoring reductant quantity in reservoirs incorporated in vehicular exhaust gas treatment systems using ultrasonic sensors, the embodiments herein are generally suitable for monitoring the quantity of a fluid in reservoirs having various other applications using acoustic sensors.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Selective catalytic reduction (SCR) devices are commonly utilized to treat exhaust gas for vehicles powered by ICEs, and rely on the delivery of reductant to the exhaust gas to effect treatment of the exhaust gas and proper catalytic operation of the SCR device. Volumetric pumps are often utilized to deliver a desired reductant dose to the exhaust gas treatment system, but pump logic and the operating characteristics of volumetric pumps often result in inaccurate dosing. The methods provided herein allow for any volumetric pump to be effectively utilized in an exhaust treatment system, such as system 10 described below, by reducing wasted reductant and $NH_3$ slip. Further, higher reductant dosing accuracy will allow SCR catalyst models (e.g., $NH_3$ storage, $NH_3$ slip, reductant dosing adaptations) to perform more accurately.

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
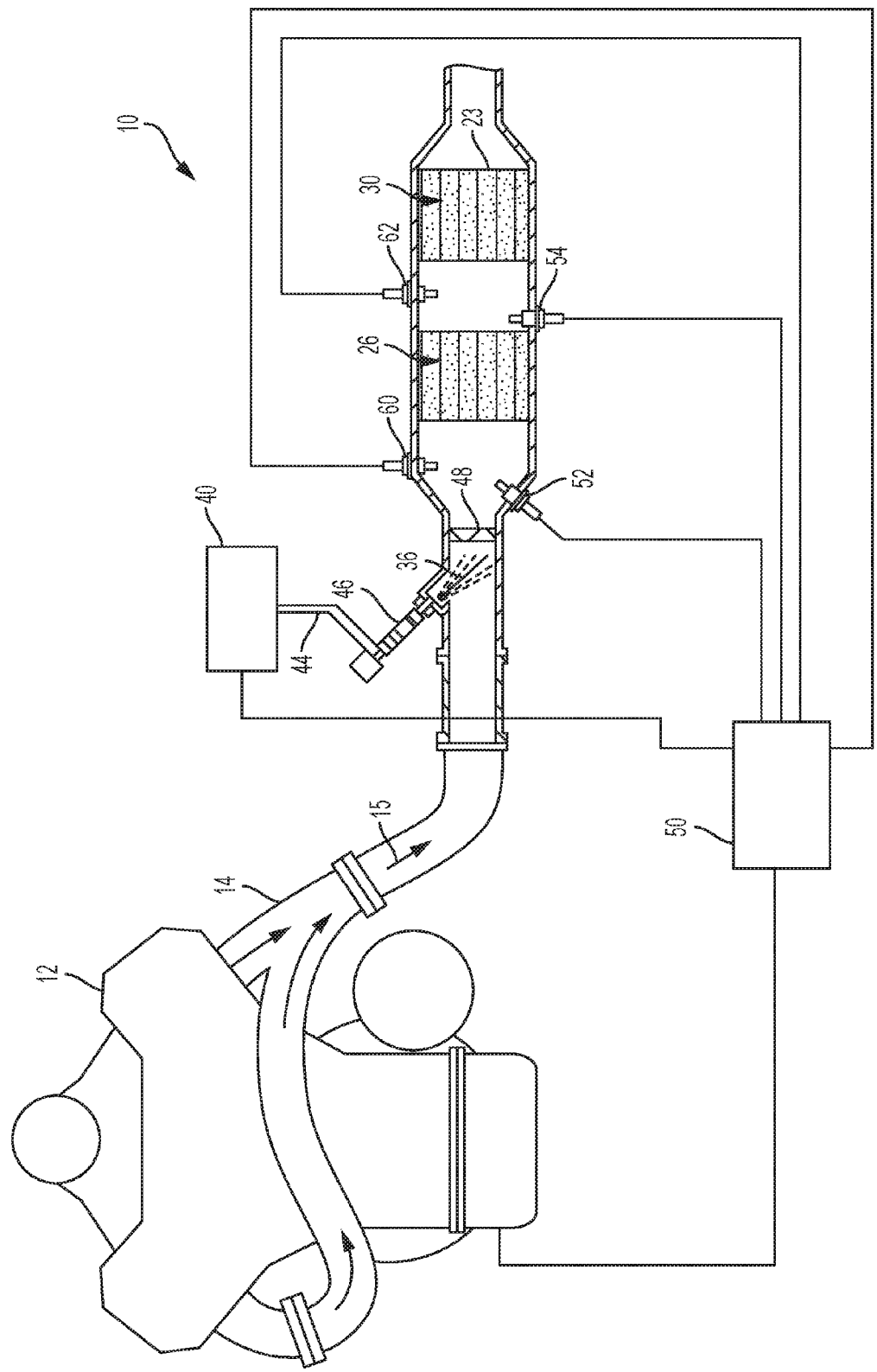
FIG. 1 shows a schematic for an exhaust gas treatment system, according to one or more embodiments.

Referring now to FIG. 1, an exemplary embodiment is directed to an exhaust gas treatment system 10, for the reduction of exhaust gas constituents of an exhaust gas source, ICE 12. The exhaust gas treatment system 10 described herein can be implemented in various engine systems that can include, but are not limited to, diesel engine systems, gasoline direct injection systems, and homogeneous charge compression ignition engine systems. The engines will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas stream 15 comprising $NO_x$ species, and the disclosure herein should accordingly be interpreted as applicable to all such devices. It should be further understood that the embodiments disclosed herein may be applicable to treatment of effluent streams not comprising $NO_x$ species, and, in such instances, ICE 12 can also generally represent any device capable of generating an effluent stream comprising not comprising $NO_x$ species.

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species. As used herein, "$NO_x$" refers to one or more nitrogen oxides. $NO_x$ species can include $N_yO_x$ species, wherein y>0 and x>0. Non-limiting examples of nitrogen oxides can include $NO$, $NO_2$, $N_2O$, $N_2O_2$, $N_2O_3$, $N_2O_4$, and $N_2O_5$.

In the embodiment as illustrated, the exhaust gas treatment system 10 devices include a SCR device 26, and an optional particulate filter device (PF) device 30. The implementation shown provides the PF device 30 in a common housing with the SCR device 26, yet this implementation is optional and implementations providing discrete housings for the SCR device 26 and PF device 30 are suitable. Further, the PF device 30 can be disposed upstream of the SCR device 26 in many embodiments. As can be appreciated, the exhaust gas treatment system 10 of the present disclosure can include various combinations of one or more of the exhaust treatment devices shown in FIG. 144, and/or other exhaust treatment devices (not shown), and is not limited to the present example. For example, the exhaust gas treatment system 10 can optionally include an oxidation catalyst (OC) device (not shown), a flow-through container of absorbent particles (not shown), an electrically heated catalyst (EHC) device (not shown), and combinations thereof. Exhaust gas treatment system 10 can further include a control module 50 operably connected via a number of sensors to monitor the engine 12 and/or the exhaust gas treatment system 10.

The SCR device 26 can be disposed downstream of the ICE 12. In some embodiments, the SCR device 26 can be disposed downstream of the optional EHC device, the optional flow-through container of absorbent particles, the optional OC device, and combinations thereof. In general, the SCR device 26 includes all devices which utilize a reductant 36 and a catalyst to convert NO and $NO_2$ to harmless components. The SCR device 26 can include, for example, a flow-through ceramic or metal monolith substrate that can be packaged in a stainless steel shell or canister having an inlet and an outlet in fluid communication with the exhaust gas conduit 14. The substrate can include a SCR catalyst composition applied thereto. The SCR device catalyst composition is generally a porous and high surface area material which can operate to convert $NO_x$ constituents in the exhaust gas 15 in the presence of a reductant 36, such as ammonia. For example, the catalyst composition can contain a zeolite and one or more base metal components such as iron (Fe), cobalt (Co), copper (Cu) or vanadium (V), sodium (Na), barium (Ba), titanium (Ti), tungsten (W), copper (Cu), and combinations thereof. In some embodiments the zeolite can be a β-type zeolite, a Y-type zeolite, a ZM5 zeolite, or any other crystalline zeolite structure such as a Chabazite or a USY (ultra-stable Y-type) zeolite. Suitable SCR catalyst compositions can have high thermal structural stability when used in tandem with PF device 30 which are regenerated via high temperature exhaust soot burning.

The SCR catalyst composition can be washcoated onto a substrate body that is housed within a canister that fluidly communicates with the exhaust gas conduit 14 and optionally other exhaust treatment devices. The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel.

The PF device 30 can be disposed downstream of the SCR device 26, as shown, or can be disposed upstream of the SCR device 26. In some embodiments, exhaust treatment system 10 can include a selective catalytic reduction filter (SCRF) device. A SCRF device generally incorporates the aspects of both an SCR device and a PF device into a single device. In some embodiments, exhaust treatment system 10 can include a SCRF device as an alternative to a SCR device 26 and a PF device 30, or in addition to a SCR device 26 and a PF device 30. For the purposes of this disclosure, SCRF devices are to be considered a type of SCR device. Accordingly, the methods disclosed herein can be utilized for both SCR devices and SCRF devices, individually or in combination.

FIG. 1 illustrates the control module 50 operably connected to the engine 12 and a reductant supply source 40. The control module 50 can further be operably connected to the optional exhaust treatment devices described above. As shown, the control module 50 can optionally be in communication with two temperature sensors 52 and 54 located in the exhaust gas conduit 14. The first temperature sensor 52 is located upstream of the SCR device 26, and the second temperature sensor 54 is located downstream of the SCR device 26. The temperature sensors 52 and 54 send electrical signals to the control module 50 that each indicate the temperature in the exhaust gas conduit 14 in specific locations. Also as shown, the control module 50 can optionally be in communication with two $NO_x$ sensors 60 and 62 that are in fluid communication with the exhaust gas conduit 14. Specifically, the first upstream $NO_x$ sensor 60 is located downstream of the ICE 12 and upstream of the SCR device 26 to detect a $NO_x$ concentration level. The second downstream $NO_x$ sensor 62 is located downstream of the SCR device 26 to detect the $NO_x$ concentration level in the exhaust gas conduit 14 in specific locations. In all such embodiments, the SCR device 26 can comprise a SCRF device 40.

The SCR device 26 generally uses a reductant 36 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, the reductant 36 can be any compound capable of decomposing or reacting in the presence of exhaust gas 15 to form ammonia. Equations (1)-(5) provide exemplary chemical reactions for $NO_x$ reduction involving ammonia.

$$6NO+4NH_3 \rightarrow 5N_2+6H_2O \qquad (1)$$

$$4NO+4NH_3+O_2 \rightarrow 4N_2+6H_2O \qquad (2)$$

$$6NO_2+8NH_3 \rightarrow 7N_2+12H_2O \qquad (3)$$

$$2NO_2+4NH_3+O_2 \rightarrow 3N_2+6H_2O \qquad (4)$$

$$NO+NO_2+2NH_3 \rightarrow 2N_2+3H_2O \qquad (5)$$

It should be appreciated that Equations (1)-(5) are merely illustrative, and are not meant to confine the SCR device 26 to a particular $NO_x$ reduction mechanism or mechanisms, nor preclude the operation of other mechanisms. The SCR device 26 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR device 26. Non-ammonia reductants can be used as a full or partial alternative to ammonia as desired. In implementations where the reductant 36 includes urea, the urea reacts with the exhaust to produce ammonia, and ammonia is supplied to the SCR device 26. The SCR device 26 can store (i.e., absorb, and/or adsorb) ammonia supplied by the reductant 36 for interaction with exhaust gas 15. Reaction (6) below provides an exemplary chemical reaction of ammonia production via urea decomposition.

$$CO(NH_2)_2+H_2O \rightarrow 2NH_3+CO_2 \qquad (6)$$

It should be appreciated that Equation (6) is merely illustrative, and is not meant to confine the urea or other reductant 36 decomposition to a particular single mechanism, nor preclude the operation of other mechanisms.

A reductant 36 can be supplied from the reductant supply source 40 and injected into the exhaust gas conduit 14 at a location upstream of the SCR device 26 using an injector 46, or other suitable method of delivery of the reductant 36 to the exhaust gas 15. The reductant 36 can be in the form of a gas, a liquid, or an aqueous solution, such as an aqueous urea solution. The reductant 36 can be mixed with air in the injector 46 to aid in the dispersion of the injected spray. A mixer or turbulator 48 can also be disposed within the exhaust conduit 14 in close proximity to the injector 46 to further assist in thorough mixing of the reductant 36 with the exhaust gas 15 and/or even distribution throughout the SCR device 26.

The precise amount of injected mass of reductant 36 is important to maintain exhaust gas 15, and particularly $NO_x$, emissions, at an acceptable level. If too little reductant 36 is injected, $NO_x$ emissions may reach an unacceptable level. Conversely, injecting too much reductant 36 can be wasteful and lead to "ammonia slip", where ammonia passes through the SCR device 26 unreacted. For example, a reductant 36 injection dosing quantity can be determined by one or more criteria such as $NO_x$ concentration upstream of a SCR device 26 (e.g., as measured by upstream $NO_x$ sensor 60), $NO_x$ concentration downstream of a SCR device 26 (e.g., as measured by downstream $NO_x$ sensor 62), downstream ammonia concentration, downstream temperature, torque output of engine 12, exhaust flow rate, exhaust pressure, engine 12 speed (e.g., rpm), engine 12 air intake rate, other suitable criteria, and combinations thereof. A reductant 36 dosing quantity can comprise a quantity (e.g., 1.2 mg), or a rate (e.g., 1.2 mg/s).

Figure 2:
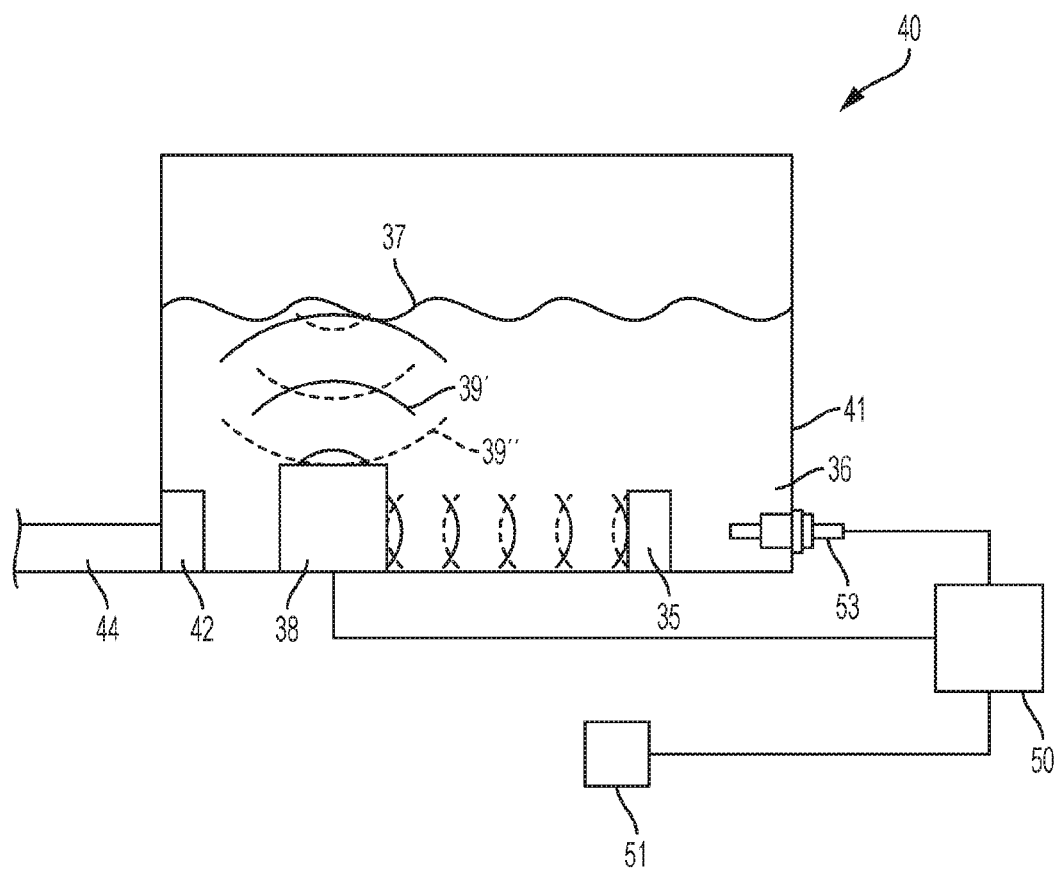
FIG. 2 illustrates a reductant supply source utilizing an acoustic sensor, according to one or more embodiments.

As illustrated in FIG. 2, a reductant supply source 40 can include a reservoir 41 suitable for storing reductant 36. Reductant 36 can be delivered via a supply line 44 to the injector 46 for injection into the exhaust treatment system 10. A pump 42 can be utilized to facilitate the delivery of reductant 36 via the supply line 44. For example, the pump 42 can receive a dosing command from the module 50 and deliver reductant 36 from the reservoir 41 to the injector 46. During operation of exhaust treatment system 10, module 50 can determine a reductant 36 injection dosing quantity via one or more of the criteria described above, and communicate the dosing quantity to the pump 42. Reductant supply source 40 can included a temperature sensor 53, operatively connected to module 50.

Over time, the amount of reductant 36 within the reservoir 41 depletes and must be replenished. Monitoring the amount of reductant 36 within the reservoir is critical to ensuring proper operation of the exhaust treatment system 10. An acoustic sensor 38 can be located within the reservoir 41, and disposed within the reductant 36. Acoustic sensors are known in the art, and are generally capable of emitting and receiving acoustic waves. The acoustic sensor 38 can comprises an ultrasonic sensor, for example. The acoustic waves generated by an ultrasonic sensor can comprise a wavelength of greater than about 20 kHz. The acoustic sensor 38 can measure the amount of reductant 36 contained within the reservoir 41 by generating an acoustic wave 39' and receiving an acoustic wave 39" reflected from a measurement surface 37 formed by the reductant. A distance between the acoustic sensor 38 and the measurement surface 37 can be determined based upon the time elapsed between generating the acoustic wave 39' and receiving the acoustic wave 39" and the speed of sound within the reductant. The distance between the acoustic sensor 38 and the measurement surface can be converted into a total volume or mass of reductant using the tank geometry, for example. The speed of sound can be determined based upon the composition of the reductant. Additionally or alternatively, the speed of sound can be determined by generating an acoustic wave 39' and receiving an acoustic wave 39" reflected from a calibration object having a fixed distance from the acoustic sensor 38. The object can include any object within the reservoir 41 such as pump 42, a reservoir 41 wall, or object 35, for example. The speed of sound can be determined utilizing a plurality of objects for increased accuracy in some embodiments.

As shown in FIG. 2, acoustic sensor 38 can be operatively connected to module 50. The acoustic sensor 38 can periodically or continuously provide information to the module 50 pertaining the level of the reductant 36 in the reservoir 41, and/or the amount of reductant 36 in the reservoir. When the reductant 36 within the reservoir 41 drops below a threshold level, or becomes completely depleted, the module 50 can trip an alarm 51 to indicate the low reductant level and signal a need for servicing. In some embodiments, the module 50 prevent engine restart or limit a vehicle speed (e.g., <10 km/h). Accordingly, it is desired to avoid false reductant 36 level detection (i.e., detecting an inaccurate reductant level). However, the temperature of the reductant 36 can impair the accuracy of acoustic sensor 38, particularly when a low reductant 36 temperature causes the reductant 36 to transition between a liquid and solid state, or to a solid state. For example, a reductant 36 comprising about 32.5% urea and about 67.5% deionized water will freeze at about −11° C. Similarly, when exhaust gas treatment system 10 is utilized on a vehicle and the vehicle is positioned on irregular terrain (e.g., an incline), the orientation of the vehicle can cause the reductant measurement surface 37 to reposition relative to the acoustic sensor 38 and contribute to a false reductant 36 measurement.

Provided herein are methods for validating acoustic sensor signals. In particular, the methods provided herein are suitable for validating measurements made by one or more acoustic sensors utilized to measure reductant levels in exhaust gas treatment systems, such as system 10. Acoustic sensor signals which are validated by the methods provided herein can subsequently be utilized by appurtenant functions, such as reductant reservoir level alarms, for example. Acoustic sensor signals, as referred to in the following methods, generally comprise information that directly relates to the volume of reductant in a reductant reservoir, or information which can be converted into the volume of reductant in a reservoir, for example by a module such as module 50. For the purpose of illustration only, the methods below will be described in relation to system 10, as used on a vehicle. However, one or skill in the art will recognize that the methods provided herein are applicable to various exhaust gas treatment systems, including those utilized in non-vehicular applications.

Figure 3:
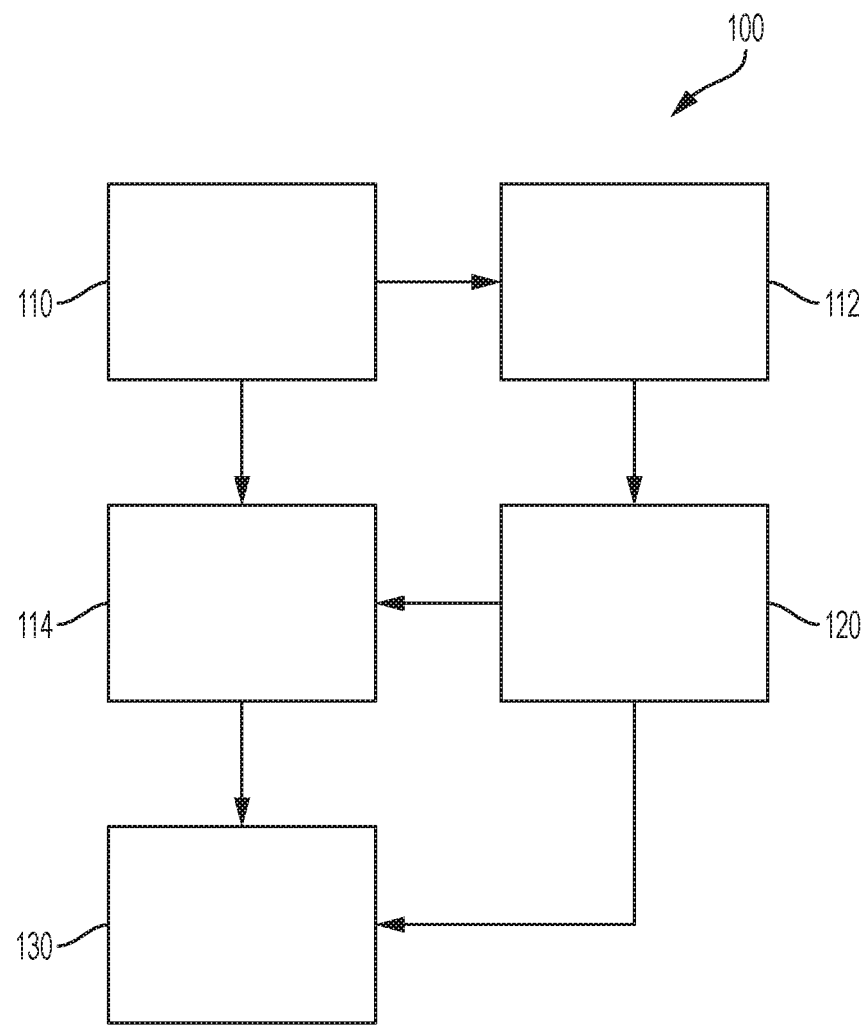
FIG. 3 illustrates a method for validating an ultrasonic sensor signal, according to one or more embodiments.

FIG. 3 illustrates a method 100 for validating acoustic sensor signals, the method 100 comprising conducting 110 a wakeup validation using a wakeup condition in order to validate 114 a first signal. For the purposes of method 100, all signals are to be considered signals generated by an acoustic sensor, such as those described above. The one or more acoustic sensors 38 generate signals continuously, and method 100 continuously validates the signals. Generating continuous signals can comprise generating a plurality of signals, in which at least two of the plurality of signals are not generated simultaneously.

Conducting 110 the wakeup validation occurs after a system wakeup. A system wakeup comprises the beginning stage of an operating cycle, wherein an operating cycle can be defined as a period during which reductant is delivered from reductant source 40 for use by exhaust gas system 10.

In a specific example, a system wakeup can occur proximate the time when ICE 12 begins operating after a period of inactivity. Additionally or alternatively, a system wakeup comprises the beginning stage of an operating cycle when an electronic control module, such as module 50, becomes engaged by the system 10 after a period of inactivity. Accordingly, the first signal is generated for validation during the beginning stage of an operating cycle. The first signal is not necessarily the first signal generated during the beginning stage of an operating cycle. For example, a short delay after the system wakeup can be observed before measuring the first signal to ensure that reductant 36 sloshing has been minimized. The wakeup condition can comprise comparing the first signal to a signal generated during the previous operating cycle. If the first signal is within an accuracy threshold relative to the previously generated signal, the first signal can be validated.

The accuracy threshold can be prescribed, or particularly determined for each wakeup stage. The accuracy threshold can be determined based upon a characteristic of the vehicle such as speed, and orientation. For example, a stationary vehicle positioned on level ground can be assigned a higher accuracy threshold (i.e., a lower acceptable variation between the first signal and the previously generated signal) relative to the accuracy threshold assigned to a vehicle which is one or more of moving or on uneven terrain. The signal generated during the previous operating cycle comprises a validated signal which was generated near the end of the previous operating cycle. The signal generated during the previous operating cycle can be an average of a plurality of validated signals. The signal generated during the previous operating cycle can be stored in flash memory, for example. The flash memory components can be included in module 50, for example.

If the wakeup condition is not satisfied, the first signal is rejected 112 and not validated. When a signal is rejected 112, method 100 further comprises conducting 120 one or more secondary validations for a signal generated after the first signal, such as a second signal. Conducting 120 one or more secondary validation comprises validating a second signal using one or more secondary validation conditions. The second signal is generated after the first signal.

In one embodiment, a secondary validation condition comprises comparing the second signal to a reductant 36 level estimation. The reductant level estimation is determined using reductant flow rate data collected between the generation of the second signal and the generation of a previously validated signal. The reductant level estimation can be determined using one or a plurality of validated signals. The previously validated signal can comprise the first signal, or a validated signal generated after the generation of the first signal. In some embodiments, the previously validated signal can comprise any generated signal which is validated after a system wakeup. In some embodiments, the previously validated signal can comprise a signal validated in the previous operating cycle. The reductant 36 flow rate data can comprise a measurement of reductant 36 removed from the reservoir 41 over a period of time between the generation of the second signal, and the generation of a previously validated signal. This measurement is subtracted from the previously validated signal to yield the reductant 36 level estimation. The reductant 36 flow rate data can be collected by a flow meter located in the reductant reservoir 41, in the supply line 44, or proximate the injector 46, for example. If the second signal is within a reductant 36 level estimation accuracy threshold relative to the reductant level estimation, the second signal can be validated.

In one embodiment, a secondary validation condition comprises determining if the ambient temperature is above a calibrated temperature. The ambient temperature can comprise the temperature of the immediate environment proximate the system 10. The ambient temperature can be measured by a sensor which is not substantially affected by temperature noise by hot components such as an ICE 12. In some embodiments the ambient temperature can be provided by an external source, such as a weather service utilizing the geographic position of a vehicle utilizing system 10. The calibrated temperature is determined based upon the freezing point of the reductant 36 utilized by the exhaust gas treatment system 10. In some embodiments, the calibrated temperature is the freezing temperature of the reductant. In some embodiments, the calibrated temperature is above the freezing temperature of the reductant. For example, for a reductant having a freezing point of −11° C., the calibrated temperature can be −6° C., or −5° C.

In one embodiment, a secondary validation condition comprises determining a weighted average of plurality temperature sensor measurements, and determining if the weighted average is above a calibrated temperature. In one embodiment, a first temperature sensor of the plurality of temperature sensors, such as temperature sensor 53, is located in, contiguous with, or substantially proximate to the reservoir 41. The first temperature sensor can be impacted by a heater (not shown) which is configured to provide heat to the reservoir 41, and accordingly may measure a temperature which is higher than the actual temperature of the reductant 36 within reservoir 41. A second temperature sensor is located near the reservoir 41, for example within 30 cm, within 25 cm, or within 20 cm of the reservoir 41, but farther from the reservoir 41 than the first temperature sensor. The second temperature sensor can be affected by the ambient temperature, and therefore in some instances (e.g., cold weather) may measure a temperature which is lower than the actual temperature of the reductant within the reservoir. The weighting of the two temperature sensor measurements is a function of the ambient temperature, wherein a decreasing ambient temperature decreases the weighting factor of the second temperature sensor. The calibrated temperature is determined based upon the freezing point of the reductant 36 utilized by the exhaust gas treatment system 10. In some embodiments, the calibrated temperature is the freezing temperature of the reductant. In some embodiments, the calibrated temperature is above the freezing temperature of the reductant.

In one embodiment, where the reductant 36 is at least partially frozen, a secondary validation condition comprises determining if the mass of unfrozen reductant 36 is above a calibrated threshold. The mass of unfrozen reductant 36 can be determined by a model, such as one or more models disclosed in commonly owned U.S. patent application Ser. No. 14/332,069, the contents of which are incorporated in their entirety. The calibrated threshold is set in order to ensure that a minimum amount of unfrozen reductant 36 is present in the reservoir 41 and/or available for delivery to system 10 by the injector 46 such that functions of system 10 which rely on reductant 46 (e.g., SCR device 26) can operate effectively.

Conducting 120 a secondary validation using one or more secondary validations comprises validating a second signal using at least one of the one or more secondary validation conditions described above. In some embodiments, conducting 120 one or more secondary validations comprises validating a second signal using a plurality of the one or more secondary validation conditions described above simultaneously. In some embodiments, conducting 120 one or more secondary validations comprises validating a second signal using all of the one or more secondary validation conditions described above simultaneously.

Method 100 can optionally comprise conducting 130 one or more subsequent validations for one or more signals generated after the first signal. Conducting 130 one or more subsequent validations can occur after a first signal is validated 114 by a wakeup validation, or after a second signal is validated 114 by a secondary validation. Performing 130 one or more subsequent validations can comprise conducting a single subsequent validation, conducting a plurality of subsequent validations, or performing continuous subsequent validations. For example, conducting 130 subsequent validations can comprise conducting continuous subsequent validations at uniform intervals, such as every 100 ms. In another embodiment, conducting 130 subsequent validations can comprise conducting continuous subsequent validations at non-uniform intervals. A subsequent validation can include one or more secondary validations described above. Subsequent validations are conducted 130 using a signal generated after the first signal. If the first signal was validated 114 using the wakeup condition, the subsequent validation is conducted 130 using a signal generated after the first signal. If the first signal was rejected 112 using the wakeup condition, the subsequent validation is conducted 130 using a signal generated after the second signal.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for monitoring a reductant quantity in a reservoir, wherein reductant is stored within the reservoir for use within an exhaust gas treatment system of a vehicle, and the reservoir comprises an acoustic sensor disposed within the reductant and capable of generating reductant quantity signals relating to the volume of reductant within the reservoir, the method comprising:
   generating a first reductant quantity signal for validation after a system wakeup using the acoustic sensor;
   conducting a wakeup validation using a wakeup condition, wherein the wakeup condition includes determining if the first reductant quantity signal is within a first accuracy threshold relative to a validated reductant quantity signal generated during a previous operating cycle;

conducting a secondary validation for a reductant quantity signal generated using the acoustic sensor after the first reductant quantity signal using one or more secondary validation conditions, wherein the one or more secondary validation conditions comprises determining if a mass of unfrozen reductant is above a calibrated threshold, wherein the calibrated threshold is set in order to ensure that a minimum amount of unfrozen reductant is present in the reservoir; and if the first reductant quantity signal and the reductant quantity signal generated after the first reductant quantity signal are each validated, subsequently injecting reductant from the reservoir into the exhaust gas treatment system.

2. The method of claim 1, wherein the first accuracy threshold is determined based on one for more of vehicle speed and vehicle orientation.

3. The method of claim 1, wherein the reductant quantity signal generated during the previous operating cycle comprises a validated reductant quantity signal which was generated at an end of the previous operating cycle.

4. The method of claim 1, wherein the reductant quantity signal generated during the previous operating cycle comprises an average of a plurality of validated reductant quantity signals which were generated at an end of the previous operating cycle.

5. The method of claim 1, wherein the reductant quantity signal generated during the previous operating cycle is stored in flash memory.

6. The method of claim 1, wherein a delay after the system wakeup is observed before generating the first reductant quantity signal for validation.

7. The method of claim 1, wherein the sensor comprises an ultrasonic sensor.

8. The method of claim 1, wherein the one or more secondary validation conditions comprises comparing the reductant quantity signal generated after the first reductant quantity signal to a reductant level estimation, wherein the reductant level estimation is determined using reductant flow rate data collected between the generation of the reductant quantity signal generated after the first reductant quantity signal and the generation of a previously validated reductant quantity signal.

9. The method of claim 8, wherein the reductant flow rate data comprises a measurement of reductant removed from the reservoir.

10. The method of claim 1, wherein the one or more secondary validation conditions comprises determining if an ambient temperature is above a calibrated temperature.

11. The method of claim 10, wherein the calibrated temperature is above the freezing point of the reductant.

12. The method of claim 1, wherein the one or more secondary validation conditions comprises determining a weighted average of plurality of temperature sensor measurements, and determining if the weighted average is above a calibrated temperature, wherein the weighted average assigns a weight to each of the plurality of temperature sensor measurements.

13. The method of claim 12, wherein one temperature sensor measurement is collected by a first temperature sensor located contiguous with the reservoir.

14. The method of claim 12, wherein one temperature sensor measurement is collected by a second temperature sensor located proximate the reservoir and is affected by ambient temperature.

15. The method of claim 14, wherein the weight assigned to the measurement collected by the second temperature decreases with decreasing ambient temperature.

16. The method of claim 12, wherein the calibrated temperature is above the freezing point of the reductant.

17. The method of claim 1, further comprising conducting one or more subsequent secondary validations for one or more reductant quantity signals generated after the first reductant quantity signal is validated by the wakeup validation, or after a reductant quantity signal generated after the first reductant quantity signal is validated by a secondary validation.

18. A method for monitoring a reductant quantity in a reservoir, wherein reductant is stored within the reservoir for use within an exhaust gas treatment system of a vehicle, and the reservoir comprises an acoustic sensor disposed within the reductant and capable of generating reductant quantity signals relating to the volume of reductant within the reservoir, the method comprising:

generating a first reductant quantity signal for validation after a system wakeup;

conducting a wakeup validation using a wakeup condition, wherein the wakeup condition includes determining if the first reductant quantity signal is within a first accuracy threshold relative to a validated reductant quantity signal generated during a previous operating cycle;

conducting a secondary validation for a second reductant quantity signal generated after the first reductant quantity signal using one or more secondary validation conditions, wherein a secondary validation includes determining if a mass of unfrozen reductant is above a calibrated threshold, wherein the calibrated threshold is set in order to ensure that a minimum amount of unfrozen reductant is present in the reservoir; and if the first reductant quantity signal and the second reductant quantity signal are each validated, subsequently injecting reductant from the reservoir into the exhaust gas treatment system.

19. The method of claim 18, further comprising conducting subsequent validation of a reductant quantity signal generated after the second reductant quantity signal using the one or more secondary validation conditions.

* * * * *